United States Patent
Kobayashi (10) Patent No.: US 6,795,386 B2
(45) Date of Patent: Sep. 21, 2004

(54) OPTICAL DISK PLAYBACK APPARATUS, OPTICAL DISK RECORDING AND PLAYBACK APPARATUS, AND LASER NOISE CANCELING CIRCUIT

(75) Inventor: Nobuyoshi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 389 days.

(21) Appl. No.: 10/013,796

(22) Filed: Dec. 10, 2001

(65) Prior Publication Data

US 2002/0085468 A1 Jul. 4, 2002

(30) Foreign Application Priority Data

Dec. 11, 2000 (JP) ......................................... 2000-375752

(51) Int. Cl.⁷ ............................................. G11B 7/125
(52) U.S. Cl. .............................. 369/53.27; 369/59.16; 369/124.13
(58) Field of Search .......................... 369/53.27, 59.16, 369/124.11, 124.12, 124.13

(56) References Cited

U.S. PATENT DOCUMENTS

| | | | | |
|---|---|---|---|---|
| 5,434,834 A | * | 7/1995 | Shinoda et al. | 369/44.13 |
| 5,448,548 A | * | 9/1995 | Taneya et al. | 369/121 |
| 5,491,682 A | * | 2/1996 | Dohmeier et al. | 369/124.12 |
| 5,901,128 A | * | 5/1999 | Hayashi et al. | 369/59.22 |
| 5,903,537 A | * | 5/1999 | Gage et al. | 369/116 |
| 6,304,533 B2 | * | 10/2001 | Toda et al. | 369/47.51 |
| 6,614,745 B1 | * | 9/2003 | Takeda et al. | 369/124.13 |

* cited by examiner

*Primary Examiner*—W. R. Young
*Assistant Examiner*—M. V. Battaglia
(74) *Attorney, Agent, or Firm*—Frommer Lawrence & Haug LLP; William S. Frommer (57) ABSTRACT

A first multiplier 251 multiplies a reproduced RF signal rf(t) by a DC component of an APC monitoring output signal m(t), which component is an output signal from an LPF 252, and then supplies a signal resulting from the multiplication to an arithmetic unit 255. A second multiplier 254 multiplies the reproduced RF signal rf(t) by a laser noise component of the APC monitoring output signal m(t), which component is an output signal from an HPF 253, and then supplies a signal resulting from the multiplication to the arithmetic unit 255. The arithmetic unit 255 subtracts the signal from the multiplier 254 from the signal from the multiplier 251 to thereby remove both an additive noise component and a modulated noise component of laser noise.

6 Claims, 11 Drawing Sheets

L(t) : LASER OUTPUT LIGHT (1)    $L(t) = P$           $\cdots$ (1)-1 : DC COMPONENT (LIGHT INTENSITY)

$+ N(t)$          $\cdots$ (1)-2 : AC COMPONENT (LASER NOISE)

FIG. 3 m(t) : APC MONITORING OUTPUT LIGHT (2)    $m(t) = A \times (P + N(t))$    $\cdots$ (2)-1 : DC COMPONENT
          $= A \times P$           $+ A \times N(t)$      $\cdots$ (2)-2 : AC COMPONENT (LASER NOISE)

A : CONVERSION COEFFICIENT

FIG. 4

R(t) : RECORDED SIGNAL (3)    $R(t) = (rm + rs)/2$     $\cdots$ (3)-1 : DC COMPONENT         $+ ABS(rm - rs)/2 \times s(t)$                       $\cdots$ (3)-2 : AC COMPONENT rm : REFLECTIVITY OF MARK    rs : REFLECTIVITY OF SPACE
s(t) : SIGNAL COMPONENT      ABS : ABSOLUTE VALUE

FIG.5

$rf(t)$ : REPRODUCED RF SIGNAL (4)  $rf(t) = k \times L(t) \times R(t)$ $= k(P+N(t))$
$\times [(rm+rs)/2 + ABS(rm-rs)/2 \times s(t)]$ $= k \times P(rm+rs)/2 \quad \cdots (4)-1:$ DC COMPONENT $+ k \times N(t) \times (rm+rs)/2$
$\quad\quad\quad\quad\quad \cdots (4)-2:$ ADDITIVE NOISE COMPONENT $+ k \times P \times ABS(rm-rs)/2 \times s(t)$
$\quad\quad\quad\quad\quad \cdots (4)-3:$ SIGNAL COMPONENT $+ k \times N(t) \times ABS(rm-rs)/2 \times s(t)$
$\quad\quad\quad\quad\quad \cdots (4)-4:$ MODULATED NOISE COMPONENT

FIG.6

PRODUCT OF REPRODUCED RF SIGNAL $rf(t)$ AND DC COMPONENT $A \times P$ OF APC MONITORING OUTPUT LIGHT (5) $rf(t) \times A \times P$ $= k \times A \times P^2 \times (rm+rs)/2$
$\quad\quad\quad\quad\quad \cdots (5)-1:$ DC COMPONENT $+ k \times A \times P \times N(t) \times (rm+rs)/2$
$\quad\quad\quad\quad\quad \cdots (5)-2:$ ADDITIVE NOISE COMPONENT $+ k \times A \times P^2 \times ABS(rm-rs)/2 \times s(t)$
$\quad\quad\quad\quad\quad \cdots (5)-3:$ SIGNAL COMPONENT $+ k \times A \times P \times N(t) \times ABS(rm-rs)/2 \times s(t)$
$\quad\quad\quad\quad\quad \cdots (5)-4:$ MODULATED NOISE COMPONENT

FIG. 7

PRODUCT OF REPRODUCED RF SIGNAL $rf(t)$ AND LASER NOISE $A \times N(t)$ OF APC MONITORING OUTPUT LIGHT (6)  $rf(t) \times A \times N(t)$ $= k \times A \times P \times N(t) \times (rm + rs)/2$
  $\cdots$ (6)-1: ADDITIVE NOISE COMPONENT $+ k \times A \times N(t)^2 \times (rm + rs)/2$
  $\cdots$ (6)-2: SQUARE OF ADDITIVE NOISE COMPONENT $+ k \times A \times P \times N(t) \times ABS(rm - rs)/2 \times s(t)$
  $\cdots$ (6)-3: MODULATED NOISE COMPONENT $+ k \times A \times N(t)^2 \times ABS(rm - rs)/2 \times s(t)$
  $\cdots$ (6)-4: SQUARE OF MODULATED NOISE COMPONENT IF $P > ABS(N(t))$, THE TERM OF $k \times A \times N(t)^2$ IS NEGLIGIBLE WITH RESPECT TO THE TERM OF $k \times A \times P \times N(t)$.

FIG. 8

PRODUCT OF REPRODUCED RF SIGNAL $rf(t)$ AND LASER NOISE $A \times N(t)$ OF APC MONITORING OUTPUT LIGHT (7)  $rf(t) \times A \times N(t)$ $= k \times A \times P \times N(t) \times (rm + rs)/2$
  $\cdots$ (7)-1: ADDITIVE NOISE $+ k \times A \times P \times N(t) \times ABS(rm - rs)/2 \times s(t)$
  $\cdots$ (7)-2: MODULATED NOISE COMPONENT

FIG. 9

SUBTRACT EQUATION (7) FROM EQUATION (5)
(ANTIPHASE ADDITION)

(8)  $rf(t) \times A \times P - rf(t) \times A \times N(t)$ $= k \times A \times P^2 \times (rm + rs)/2$ $\cdots$ (8)-1: DC COMPONENT $+ k \times A \times P^2 \times ABS(rm - rs)/2 \times s(t)$ $\cdots$ (8)-2: SIGNAL COMPONENT FIG. 10C REPRODUCED RF SIGNAL rf(t) AFTER NOISE REMOVING PROCESSING

NOISE CAN BE CANCELLED AT ALL AMPLITUDE LEVELS

=

FIG. 10B PRODUCT OF REPRODUCED RF SIGNAL rf(t) AND LASER NOISE COMPONENT OF APC MONITORING OUTPUT

− (SUBTRACTION)

FIG. 10A PRODUCT OF REPRODUCED RF SIGNAL rf(t) AND DC COMPONENT OF APC MONITORING OUTPUT

OPTICAL DISK PLAYBACK APPARATUS, OPTICAL DISK RECORDING AND PLAYBACK APPARATUS, AND LASER NOISE CANCELING CIRCUIT

BACKGROUND OF THE INVENTION

The present invention relates to laser noise removal in an optical disk apparatus using various optical disks such as a DVD (Digital Versatile Disk) and a CD (Compact Disk) as a recording medium, for example.

Playback apparatus as well as recording and playback apparatus using an optical disk as a recording medium have come into wide use. For example, DVD players and CD players are widely used in ordinary households. Optical disk recording and playback apparatus capable of recording on a DVD-R (DVD Recordable), a DVD-RW (DVD Rewritable), a CD-R (CD Recordable), a CD-RW (CD Rewritable) and the like are widely used as a data recording apparatus for a personal computer, for example.

In such an optical disk apparatus as an optical disk playback apparatus or an optical disk recording and playback apparatus, a reproduced radio-frequency signal (reproduced RF signal) obtained from an optical disk includes so-called laser noise caused by laser light applied to the optical disk. Therefore, for highly accurate reproduction, methods for removing the laser noise from the reproduced RF signal have been proposed.

For example, Japanese Patent Laid-Open No. Hei 10-124919 proposes a method for removing the laser noise from the reproduced RF signal by subtracting a monitoring output signal for APC (Automatic Power Control) from the reproduced RF signal. An optical disk playback apparatus using this method is shown in FIG. 16.

Figure 16:
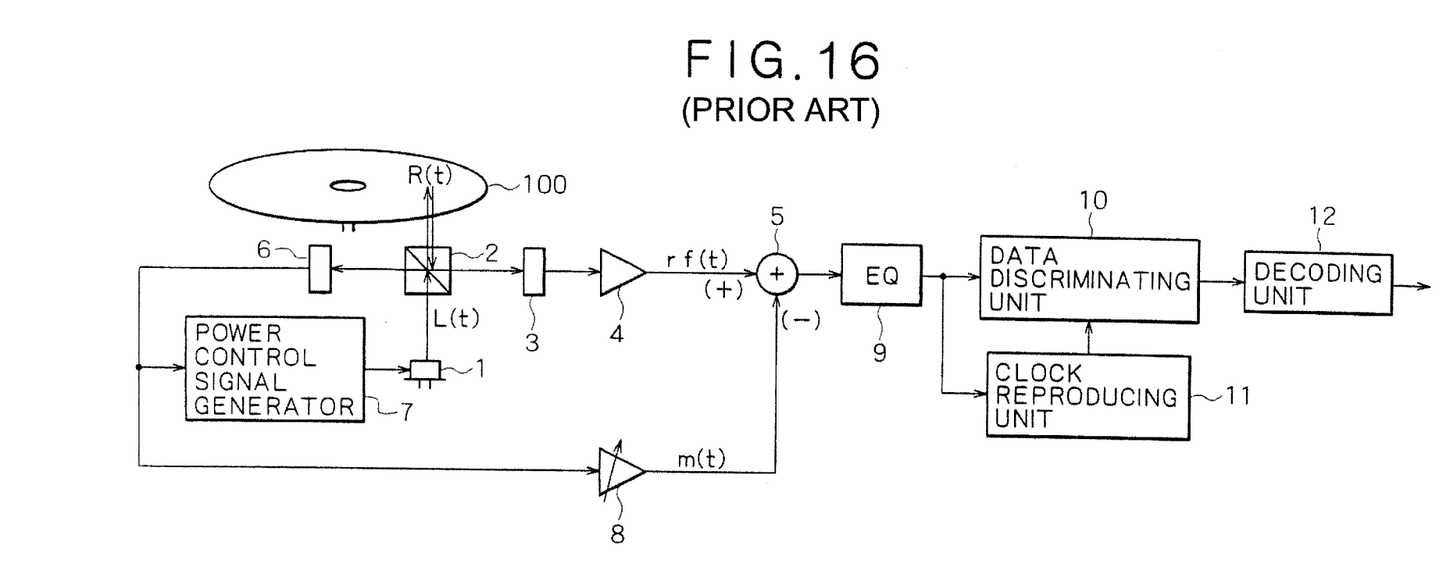
FIG. 16 is a diagram of assistance in explaining laser noise canceling processing of a conventional optical disk playback apparatus.

As shown in FIG. 16, laser light is applied from a laser light source (semiconductor laser device) 1 through a beam splitter 2 to an optical disk 100. The light reflected from the optical disk 100 is supplied to a photodetector (light receiving device) 3 via the beam splitter 2, and then converted into an electric signal by the photodetector 3 The output signal from the light receiving device 3 is amplified by an amplifier 4, and then supplied to an arithmetic unit (adder) 5 as a reproduced RF signal rf(t).

In the meantime, the laser light emitted from the laser light source 1 is also supplied to a photodetector (light receiving device) 6 via the beam splitter 2, and then converted into an electric signal by the photodetector 6. The output signal from the light receiving device 6 is an APC monitoring output signal used for automatically adjusting power (light intensity) of the laser light. The APC monitoring output signal is supplied to a power control signal generating unit 7. The APC monitoring output signal is also supplied to an amplifier 8 having a gain adjusting function, then adjusted in gain by the amplifier 8, and supplied to the arithmetic unit 5 as an APC monitoring output signal m(t).

The arithmetic unit 5 subtracts the APC monitoring output signal m(t) from the reproduced RF signal rf(t) (antiphase addition). Thus, a so-called additive laser noise component (additive noise component) possessed by the laser light itself is subtracted and hence removed from the reproduced RF signal rf(t) including the laser noise component.

The reproduced RF signal rf(t) from which the additive noise component is removed is supplied to an equalizer 9 to be subjected to predetermined equalizing processing. Thereafter, a data discriminating unit 10 discriminates (distinguishes) data of the reproduced RF signal rf(t). The discriminated data is decoded by a decoding unit 12 and then reproduced. A clock reproducing unit 11 reproduces a clock signal used in discriminating the data.

Thus, by removing the additive noise component possessed by the laser light itself from the reproduced RF signal rf(t), it is possible to reduce jitter of the reproduced RF signal rf(t) around zero crossing level (shaking of the reproduced RF signal in a direction of a time axis), and to thereby improve a reproduction margin. Therefore, an optical disk apparatus with a reproducing system performing binary detection can make favorable reproduction.

Although the above-described conventional method for canceling the laser noise can cancel laser noise around zero crossing level, the method cannot cancel laser noise in other parts. The reproduced RF signal rf(t) is formed from the laser light applied to the optical disk and reflected from the optical disk. The light reflected from the optical disk is a product of the laser light applied to the optical disk multiplied by a recorded signal recorded on the optical disk (signal recorded on the optical disk by marks and spaces).

Hence, the reproduced RF signal rf(t) includes not only the so-called additive noise component possessed by the laser light itself but also a modulated noise component resulting from the additive noise component being modulated by the recorded signal of the optical disk.

Figure 17A:
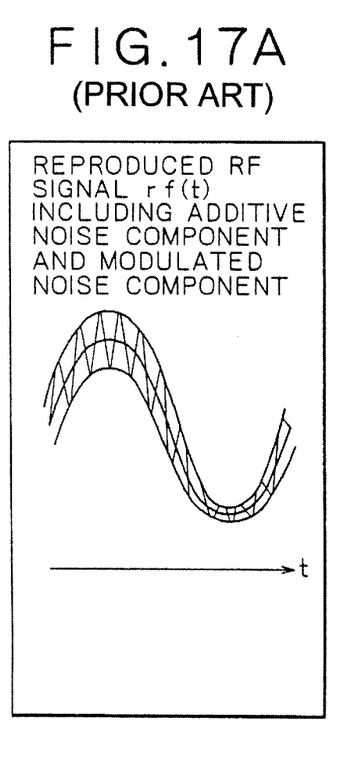
FIGS. 17A, 17B, and 17C are diagrams of assistance in explaining the laser noise canceling processing of the conventional optical disk playback apparatus.
Figure 17B:
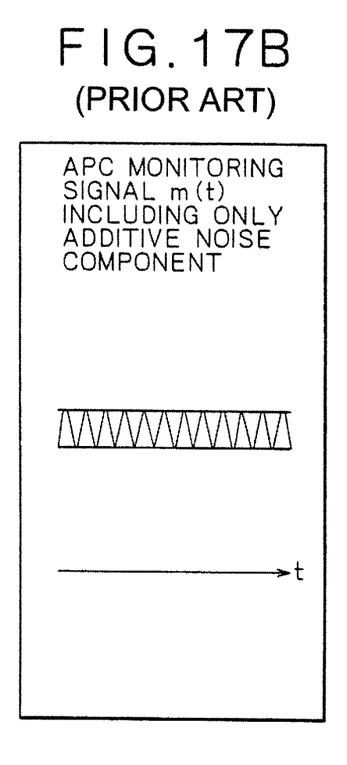
Figure 17C:
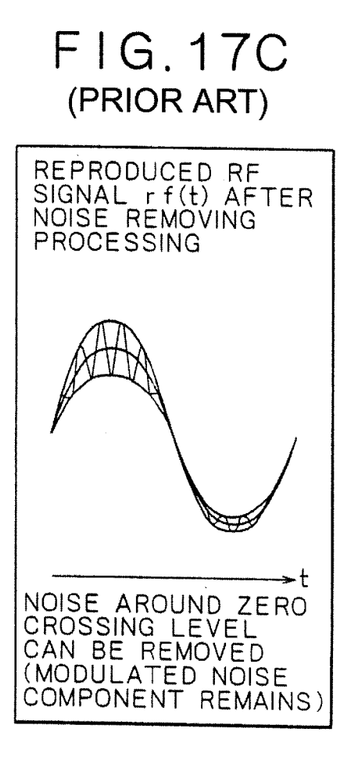

Thus, even when the APC monitoring output signal m(t) formed from the laser light itself from the laser light source 1 and including only the additive noise component as shown in FIG. 17B is subtracted from the reproduced RF signal rf(t) including the additive noise component and the modulated noise component as shown in FIG. 17A, the laser noise around zero crossing level can be removed but the modulated noise component remains, as shown in FIG. 17C.

The mainstream of reproduced signal processing by a reproducing system of an optical disk apparatus has recently been shifting from the conventional binary detection processing to PRML (Partial Response equalization and Maximum Likelihood detection) signal processing.

In the PRML signal processing, the reproduced RF signal uses multiple decision levels, and a Viterbi detector having multiple reference levels is used. It is therefore desirable that an optical disk apparatus having a reproducing system performing PRML signal processing reduce laser noise not only around zero crossing level of the reproduced RF signal but also around each of the reference levels.

Although the conventional method for canceling laser noise as described with reference to FIG. 16 and FIGS. 17A, 17B, and 17C is effective in the reproducing system that performs the conventional binary detection processing, the conventional method is not adequate for use in the optical disk apparatus performing the PRML reproduced signal processing because the conventional method cannot remove the modulated noise component from the reproduced RF signal rf(t).

In addition, the conventional method for canceling laser noise as described with reference to FIG. 16 and FIGS. 17A, 17B, and 17C is required to adjust the amplitude of laser noise dynamically depending on variation in the reflectivity of the optical disk (medium), variation in the gain of the I/V amplifier, variation in laser power and the like. This amplitude adjustment (gain adjustment) is made by the amplifier 8 having a gain adjusting function shown in FIG. 16.

Thus, the conventional method for canceling laser noise requires an AGC (Automatic Gain Control) circuit, and it is extremely difficult for the AGC circuit to perform proper processing because the foregoing various variation factors in laser noise need to be considered.

SUMMARY OF THE INVENTION

It is an object of the present invention to provide an optical disk playback apparatus, an optical disk recording and playback apparatus, and a laser noise canceling circuit applied to an optical disk apparatus that can reliably and readily remove all laser noise components from the reproduced RF signal.

To achieve the above object according to first aspect, there is provided an optical disk playback apparatus including: a generating unit for generating laser light to be applied to an optical disk; a first light receiving unit for receiving the laser light applied from the generating unit to the optical disk and reflected from the optical disk, and converting the reflected light into an electric signal; a second light receiving unit for receiving at least part of the laser light applied from the generating unit to the optical disk, and converting the part of the laser light into an electric signal; a low-pass filter for extracting a direct-current component of the laser light from an output signal of the second light receiving unit; a first multiplying unit for determining a product of an output signal from the first light receiving unit and an output signal from the low-pass filter; a high-pass filter for extracting a laser noise component of the laser light from the output signal of the second light receiving unit; a second multiplying unit for determining a product of the output signal from the first light receiving unit and an output signal from the high-pass filter; and an arithmetic unit for subtracting an output signal of the second multiplying unit from an output signal of the first multiplying unit.

The optical disk playback apparatus according to the first aspect extracts the direct-current component of the laser light from a monitoring output signal of the laser light or the output signal from the second light receiving unit by means of the low-pass filter, and extracts the laser noise component of the laser light from the monitoring output signal of the laser light or the output signal from the second light receiving unit by means of the high-pass filter.

The first multiplying unit multiplies a reproduced RF signal or the output signal from the first light receiving unit by the direct-current component of the laser light from the low-pass filter, thereby forming an output signal including the direct-current component of the laser light, a signal component read from the optical disk, an additive component of laser noise, and a modulated noise component resulting from the additive component of the laser noise being modulated by a recorded signal.

The second multiplying unit multiplies the reproduced RF signal or the output signal from the first light receiving unit by the laser noise component of the laser light from the high-pass filter, thereby forming an output signal including the additive component of the laser noise and the modulated noise component resulting from the additive component of the laser noise being modulated by the recorded signal.

Then, the arithmetic unit subtracts the output signal from the second multiplying unit from the output signal from the first multiplying unit (antiphase addition). By performing such product-sum operation, it is possible to remove from the reproduced RF signal both the additive noise component and the modulated noise component of the laser noise included in the reproduced RF signal, and to thereby perform favorable reproduction processing.

In the optical disk playback apparatus according to the first aspect, a pass band which is allowed to pass through each of the low-pass filter and the high-pass filter may be determined on the basis of a data transfer rate of the optical disk playback apparatus.

The above optical disk playback apparatus sets a reference frequency fc for indicating the pass bands of the low-pass filter and the high-pass filter at an appropriate frequency that prevents reproducing jitter from being aggravated, on the basis of the data transfer rate of a reproducing system of the optical disk playback apparatus. The reference frequency fc is for example $1/1000$ (one thousandth) of a Nyquist frequency fn or lower, which is ½ (one half) of the data transfer rate of the reproducing system.

It is thereby possible to accurately extract the direct-current component of the laser light and the laser noise component included in the laser light, and properly remove (cancel) both the additive component and the modulated component of the laser noise included in the reproduced RF signal.

BRIEF DESCRIPTION OF THE DRAWINGS

FIG. 5 shows an equation of assistance in explaining a reproduced RF signal rf(t);

FIG. 6 shows an equation of assistance in explaining processing of a first multiplier shown in FIG. 1;

DETAILED DESCRIPTION OF THE PREFERRED EMBODIMENTS

An embodiment of an optical disk playback apparatus, an optical disk recording and playback apparatus, and a laser noise canceling circuit according to the present invention will hereinafter be described with reference to the drawings. In the following, description will be made by taking as an example a case where an optical disk playback apparatus, an optical disk recording and playback apparatus, and a laser noise canceling circuit according to the present invention are applied to an optical disk playback apparatus or an optical disk recording and playback apparatus using a DVD, for example, as a recording medium.

Figure 1:
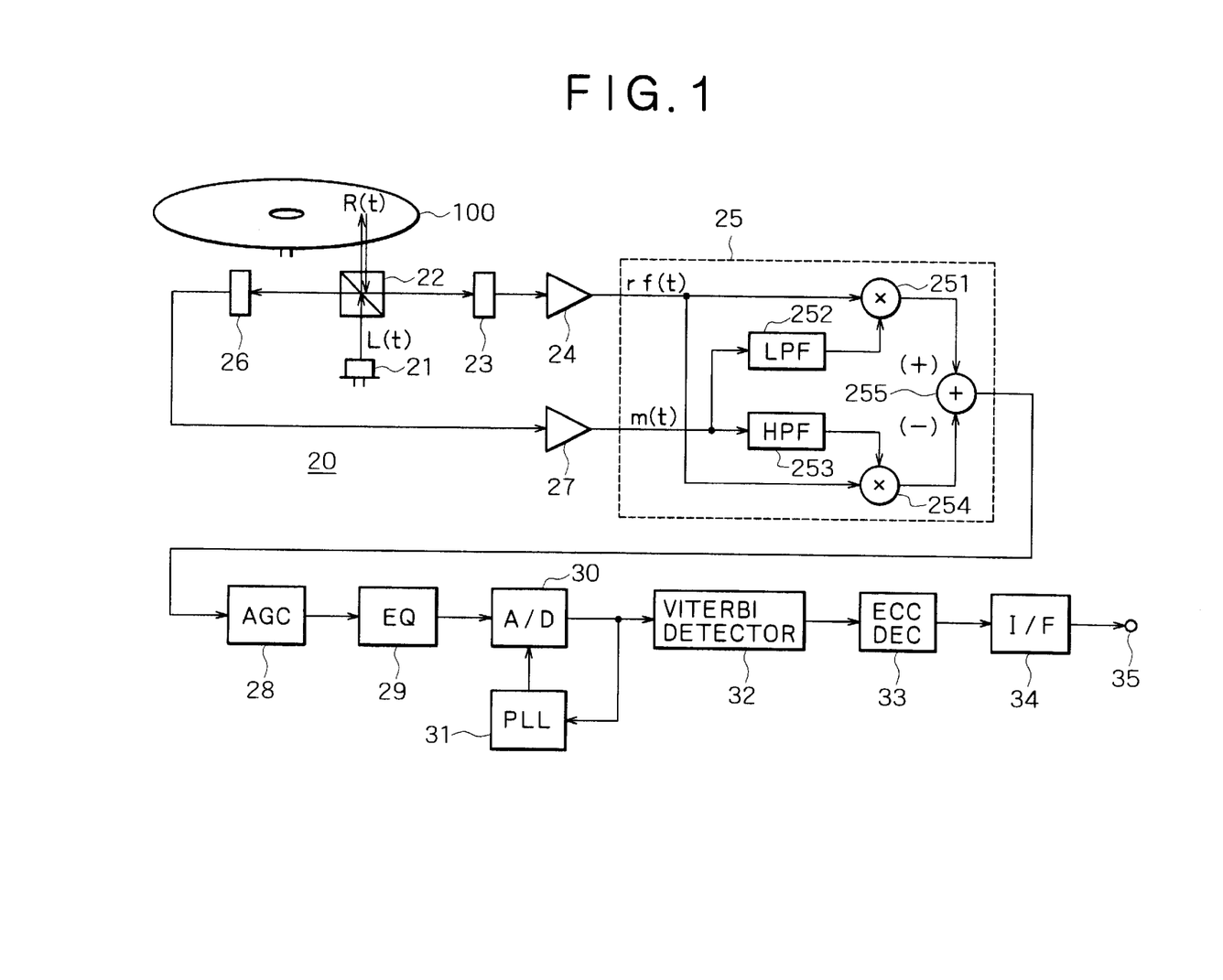
FIG. 1 is a block diagram of assistance in explaining an embodiment of an optical disk playback apparatus and a laser noise canceling circuit according to the present invention.

FIG. 1 is a diagram of assistance in explaining an optical disk playback apparatus according to the present embodiment (hereinafter referred to simply as an optical disk apparatus). In FIG. 1, an optical disk 100 is for example a DVD on which software such as a movie is recorded. As with various optical disk apparatus, the optical disk apparatus according to the present embodiment has a servo system and a control system. For simplicity, however, description will be made principally of a reproducing system of the optical disk apparatus, and description of the servo system and the control system will be omitted.

As shown in FIG. 1, the reproducing system 20 of the optical disk apparatus according to the present embodiment includes: a semiconductor laser device 21; a beam splitter 22; a photodetector (first light receiving device) 23; an amplifier 24; a laser noise canceling circuit 25; a photodetector (second light receiving device) 26; an amplifier 27; an AGC circuit 28; an equalizer (described as EQ in FIG. 1) 29; an A/D (analog/digital) converter 30; a PLL (Phase Locked Loop) circuit 31; a Viterbi detector 32; an ECC (Error Correcting Code) decoder 33; an interface circuit (described as I/F in FIG. 1) 34; and a connecting terminal 35.

As shown in FIG. 1, the laser noise canceling circuit 25 in the optical disk apparatus according to the present embodiment is of a product-sum operation type, including: an analog multiplier (first multiplier) 251; a low-pass filter (hereinafter abbreviated as LPF) 252; a high-pass filter (hereinafter abbreviated as HPF) 253; an analog multiplier (second multiplier) 254; and an arithmetic unit (adder that performs antiphase addition) 255. The laser noise canceling circuit 25 makes it possible to cancel (eliminate) both an additive noise component and a modulated noise component of laser noise.

As shown in FIG. 1, laser output light L(t) emitted from the semiconductor laser device (LD) 21, which is a laser light generating unit, is applied through the beam splitter 22 to the optical disk 100. The beam splitter 22 transmits the laser output light from the semiconductor laser device 21 so that the laser output light is applied to the optical disk 100, and also refracts the laser output light from the semiconductor laser device 21 toward the photodetector 26 so that the laser output light enters the photodetector 26.

In addition, the beam splitter 22 refracts the laser output light applied to the optical disk 100 and reflected from the optical disk 100 toward the photodetector 23 so that the reflected light enters the photodetector 23. The light reflected from the optical disk 100 and refracted toward the photodetector 23 by the beam splitter 22 is received by the photodetector 23. The photodetector 23 is intended to form a reproduced RF signal from the reflected light from the optical disk 100.

The photodetector (RFPD) 23 for forming a reproduced RF signal converts the light reflected from the optical disk 100 and received by the photodetector 23 into an electric signal, and then supplies the electric signal to the amplifier 24. The amplifier 24 amplifies the output signal from the photodetector 23 to a predetermined level, and then supplies the amplified signal to the multiplier 251 of the laser noise canceling circuit 25 as a reproduced RF signal rf(t).

In the meantime, the laser output light emitted from the semiconductor laser device 21 and refracted toward the photodetector 26 by the beam splitter 22 is received by the photodetector 26. The photodetector 26 is intended to form an APC monitoring output signal for automatically adjusting power of the laser output light emitted from the semiconductor laser device 21.

The photodetector (APCPD) 26 for forming an APC monitoring output signal converts the laser output light from the semiconductor laser device 21 received by the photodetector 26 into an electric signal, and then supplies the electric signal to the amplifier 27. The amplifier 27 amplifies the output signal from the photodetector 26 to a predetermined level, and then supplies the amplified signal to the LPF 252 and the HPF 253 of the laser noise canceling circuit 25 as an APC monitoring output signal m(t).

Figure 2:
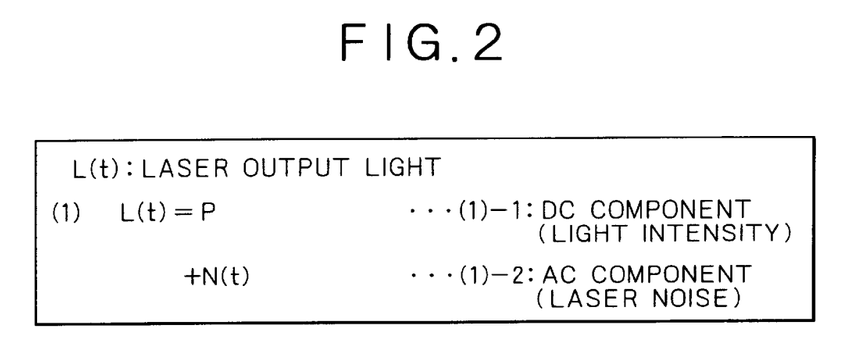
FIG. 2 shows an equation of assistance in explaining laser output light L(t) from a semiconductor laser device.

As shown in an equation (1) of FIG. 2, the laser output light L(t) emitted from the semiconductor laser device 21 is represented by a sum of light intensity P and laser noise N(t) of the laser output light. The laser noise N(t) is a noise component possessed by the laser output light itself, and the noise component is increased as the output power of the laser output light is lowered. In FIG. 2, the light intensity P of (1)—1 is a direct-current component (DC component), and the laser noise N(t) of (1)—2 is an alternating-current component (AC component).

Figure 3:
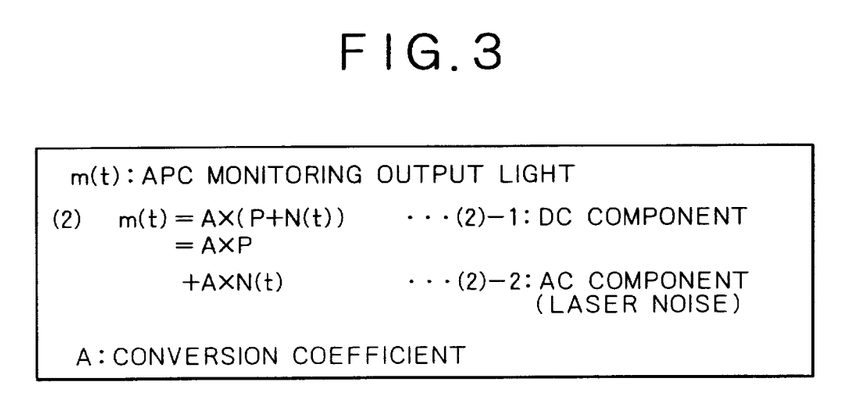
FIG. 3 shows an equation of assistance in explaining an APC monitoring output signal m(t)

As shown in an equation (2) of FIG. 3, the APC monitoring output signal m(t) outputted from the amplifier 27 is represented by a product of a predetermined conversion coefficient A and the laser output light L(t). In FIG. 3, the APC monitoring output signal m(t) can be expressed as a sum of a product of the conversion coefficient A and the light intensity P as shown in (2)—1 and a product of the conversion coefficient A and the laser noise N(t) as shown in (2)—2.

Figure 4:
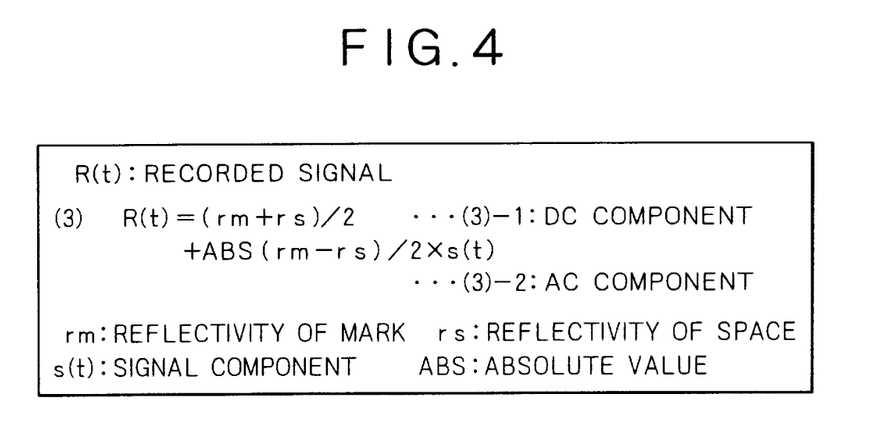
FIG. 4 shows an equation of assistance in explaining a recorded signal R(t) recorded on an optical disk.

When letting rm be reflectivity of the laser output light from a mark recorded on the optical disk 100, rs be reflectivity of the laser output light from a space recorded on the optical disk 100 which is a part other than the mark, and s(t) be a signal component recorded on the optical disk 100, a recorded signal R(t) recorded on the optical disk 100 can be expressed as shown in an equation (3) of FIG. 4.

Specifically, in FIG. 4, the recorded signal R(t) is represented by a sum of: a term of one-half of a sum of the reflectivity rm of the mark and the reflectivity rs of the space (average value of the reflectivity of the mark and the reflectivity of the space) as shown in (3)—1; and a term expressed as a multiplication of one-half of an absolute value (ABS) of a difference between the reflectivity rm of the mark and the reflectivity rs of the space by the signal component s(t) recorded on the optical disk 100 (signal modulation component) as shown in (3)—2.

The term shown in (3)—1 is the average value of the reflectivity of the mark and the reflectivity of the space, as described above, and is a DC component. The term shown in (3)—2 represents reflected light modulated by a signal recorded on the optical disk 100, that is, the signal component recorded on the optical disk, and is an AC component.

As shown in an equation (4) of FIG. 5, the reproduced RF signal rf(t) outputted from the amplifier 24 in FIG. 1 can be expressed as a product of the laser output light L(t) shown in the equation (1) of FIG. 2 and the recorded signal R(t) shown in the equation (3) of FIG. 4. A letter k in the equation (4) of FIG. 5 is a constant of proportionality.

When the equation (4) of FIG. 5 is expanded by substituting the equation (1) of FIG. 2 and the equation (3) of FIG. 4 into the equation (4) of FIG. 5, the reproduced RF signal rf(t) can be resolved into four terms (four components) as shown in (4)—1, (4)—2, (4)—3, and (4)—4 in FIG. 5.

In FIG. 5, (4)—1 is a term representing a DC component being a product of the proportionality constant k, the light intensity P, and the average value of the reflectivities of the mark and the space of the optical disk ((rm+rs)/2). (4)—2 is a term representing an additive noise component being a product of the proportionality constant k, the laser noise N(t), and the average value of the reflectivities of the mark and the space ((rm+rs)/2).

In FIG. 5, (4)—3 is a term representing a signal component being a product of the proportionality constant k, the light intensity P, and the signal modulation component of the reflected light (ABS(rm−rs)/2×s(t)). (4)—4 is a term representing a modulated noise component being a product of the proportionality constant k, the laser noise N(t), and the signal modulation component of the reflected light (ABS(rm−rs)/2×s(t)).

Thus, the reproduced RF signal rf(t) includes both the additive noise component represented by (4)—2 and the modulated noise component represented by (4)—4 in FIG. 5. The reproduced RF signal rf(t) is supplied to the first multiplier 251 and the second multiplier 254, as shown in FIG. 1.

As shown in FIG. 1, a low-frequency component of the APC monitoring output signal m(t) extracted by the LPF 252 is supplied to the first multiplier 251. The low-frequency component of the APC monitoring output signal m(t) is the DC component (coefficient A×light intensity P) of the APC monitoring output signal m(t) represented by the expression shown in (2)—1 in FIG. 3.

As shown in FIG. 1, a high-frequency component of the APC monitoring output signal m(t) extracted by the HPF 253 is supplied to the second multiplier 254. The high-frequency component of the APC monitoring output signal m(t) is the laser noise component (coefficient A×laser noise N(t)) of the APC monitoring output signal m(t) represented by the expression shown in (2)—2 in FIG. 3.

Then, the first multiplier 251 and the second multiplier 254 each perform multiplication operation. The first multiplier 251 forms a minuend signal (signal from which another signal is subtracted) for the arithmetic unit 255 in a succeeding stage. The second multiplier 254 forms a subtrahend signal (signal to be subtracted) for the arithmetic unit 255 in the succeeding stage.

The multiplication signal processing performed by the first multiplier 251 will first be described. As described above, the first multiplier 251 is supplied with the reproduced RF signal rf(t) from the amplifier 24 and the DC component (coefficient A×light intensity P) of the APC monitoring output signal m(t) from the LPF 252.

The multiplication of the reproduced RF signal rf(t) by the DC component (A×P) of the APC monitoring output signal results in four terms (four components): (5)—1, (5)—2, (5)—3, and (5)—4, as shown in an equation (5) of FIG. 6.

In FIG. 6, (5)—1 is a term representing a DC component being a product of the proportionality constant k, the coefficient A, the square of the light intensity P, and the average value of the reflectivities of the mark and the space ((rm+rs)/2). (5)—2 is a term representing an additive noise component being a product of the proportionality constant k, the coefficient A, the light intensity P, the laser noise N(t), and the average value of the reflectivities of the mark and the space ((rm+rs)/2).

In FIG. 6, (5)—3 is a term representing a signal component being a product of the proportionality constant k, the coefficient A, the square of the light intensity P, and the signal modulation component of the reflected light (ABS (rm−rs)/2×s(t)). (5)—4 is a term representing a modulated noise component being a product of the proportionality constant k, the coefficient A, the light intensity P, the laser noise N(t), and the signal modulation component of the reflected light (ABS(rm−rs)/2×s(t)).

Thus, the first multiplier 251 multiplies the reproduced RF signal rf(t) by the DC component (coefficient A×light intensity P) of the APC monitoring output signal to thereby form the reproduced RF signal rf(t) which includes the additive noise component and the modulated noise component and whose signal level is heightened.

The multiplication operation by the second multiplier 254 will next be described. As described above, the second multiplier 254 is supplied with the reproduced RF signal rf(t) from the amplifier 24 and the laser noise component (coefficient A×laser noise N(t)) of the APC monitoring output signal m(t) from the HPF 253.

The multiplication of the reproduced RF signal rf(t) by the laser noise component (coefficient A×laser noise N(t)) of the APC monitoring output signal results in four terms (four components): (6)—1, (6)—2, (6)—3, and (6)—4 as shown in an equation (6) of FIG. 7.

Figure 7:
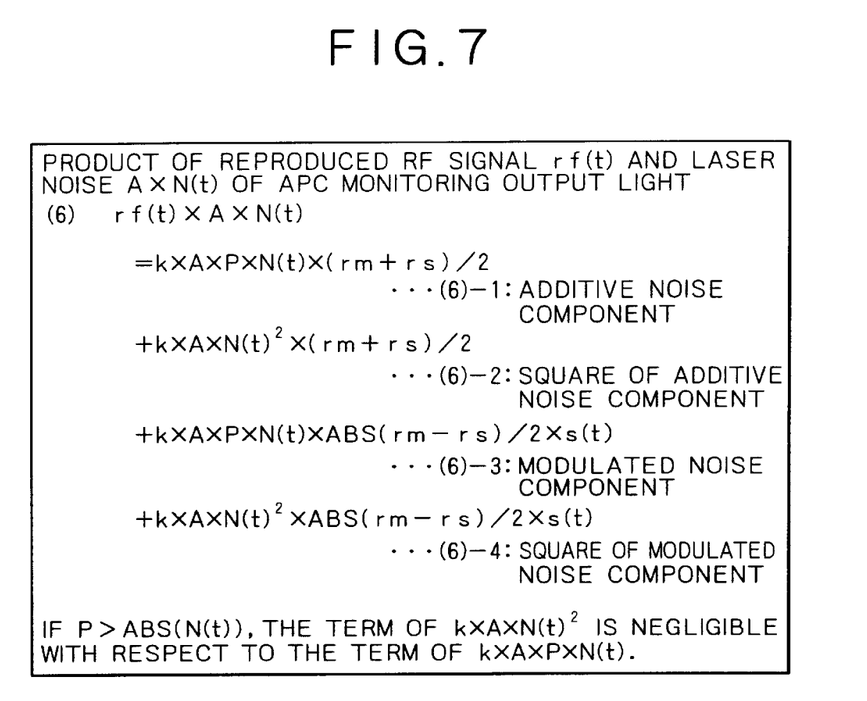
FIG. 7 shows an equation of assistance in explaining processing of a second multiplier shown in FIG. 1.

In FIG. 7, (6)—1 is a term representing an additive noise component being a product of the proportionality constant k, the coefficient A, the light intensity P, the laser noise N(t), and the average value of the reflectivities of the mark and the space ((rm+rs)/2). (6)—2 is a term representing the square of an additive noise component being a product of the proportionality constant k, the coefficient A, the square of the laser noise N(t), and the average value of the reflectivities of the mark and the space ((rm+rs)/2).

In FIG. 7, (6)—3 is a term representing a modulated noise component being a product of the proportionality constant k, the coefficient A, the light intensity P, the laser noise N(t), and the signal modulation component of the reflected light (ABS(rm−rs)/2×s(t)). (6)—4 is a term representing the square of a modulated noise component being a product of the proportionality constant k, the coefficient A, the light intensity P, the square of the laser noise N(t), and the signal modulation component of the reflected light (ABS(rm−rs)/2×s(t)).

The laser noise N(t) is a very small value as compared with the light intensity P of the laser output light, and thus the square of the laser noise N(t) represents a very small value. Therefore, the terms of (6)—2 and (6)—4 including the square of the laser noise N(t) represent infinitesimal values as compared with the terms of (6)—1 and (6)—3 in which the light intensity P is multiplied by the laser noise N(t), and are thus negligible.

Figure 8:
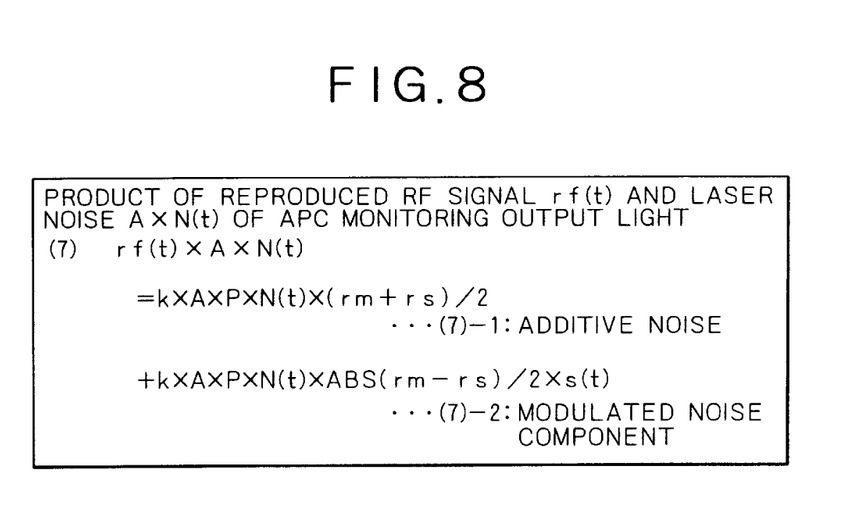
FIG. 8 shows an equation of assistance in explaining the processing of the second multiplier shown in FIG. 1.

Thus, since the term of (6)—2 and the term of (6)—4 are negligible in the equation (6) of FIG. 7, the equation (6) of FIG. 7 can be reduced to an equation having two terms: the term of (7)—1 representing the additive noise component and the term of (7)—2 representing the modulated component as shown in an equation (7) of FIG. 8.

Thus, the second multiplier 254 multiplies the reproduced RF signal rf(t) by the laser noise (coefficient A×laser noise N(t)), thereby making it possible to form a signal including all the laser noise components included in the reproduced RF signal rf(t) formed by adding the additive noise component and the modulated noise component included in the reproduced RF signal rf(t).

Then, the output signal from the first multiplier 251 and the output signal from the second multiplier 254 are supplied to the arithmetic unit 255 of the laser noise canceling circuit 25. The arithmetic unit 255 subtracts the output signal from the second multiplier 254 from the output signal from the first multiplier 251 (antiphase addition).

Figure 9:
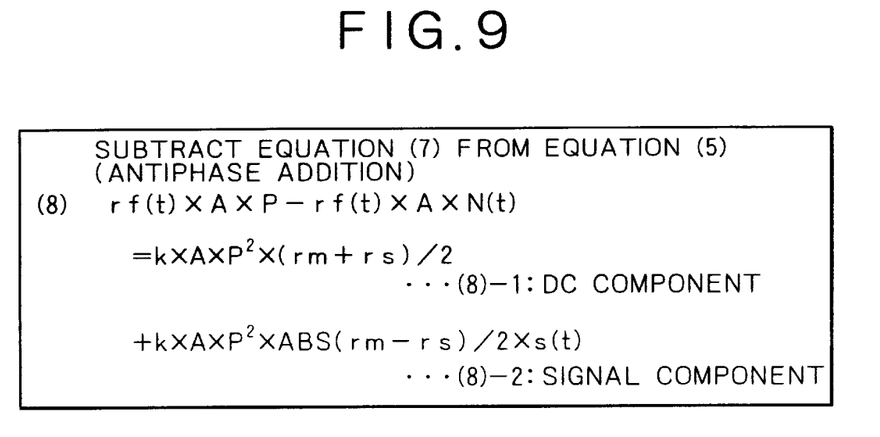
FIG. 9 shows an equation of assistance in explaining processing of an arithmetic unit shown in FIG. 1.

Specifically, when the arithmetic processing by the arithmetic unit 255 of the laser noise canceling circuit 25 is represented by an equation, the arithmetic unit 255 performs processing of subtracting the equation (7) of FIG. 8 from the equation (5) of FIG. 6, as shown in an equation (8) of FIG. 9. Hence, the arithmetic unit 255 cancels the term of (5)—2 and the term of (5)—4 in the equation (5) shown in FIG. 6 by the term of (7)—1 and the term of (7)—2 in the equation (7) shown in FIG. 8.

Thus, as shown in the equation (8) of FIG. 9, the arithmetic unit 255 outputs a signal including: the DC component ((8)—1) being a product of the proportionality constant k, the coefficient A, the square of the light intensity P, and the average value of the reflectivities of the mark and the space ((rm+rs)/2); and the signal component ((8)—2) being a product of the proportionality constant k, the coefficient A, the square of the light intensity P, and the signal modulation component of the reflected light from the mark and the space (ABS(rm−rs)/2×s(t)). In other words, the arithmetic unit 255 outputs the reproduced RF signal from which the additive noise component and the modulated noise component are removed.

Figure 10A:
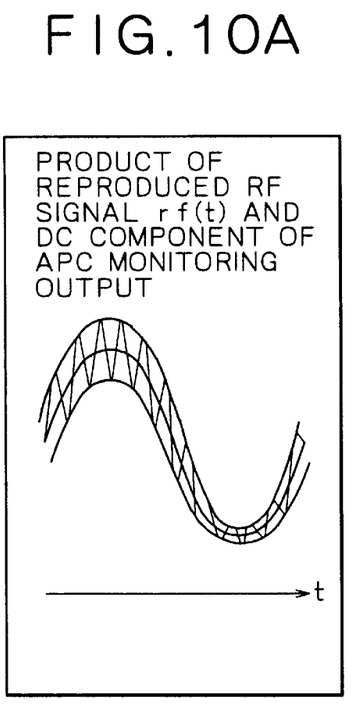
FIGS. 10A, 10B, and 10C are diagrams of assistance in explaining processing of the laser noise canceling circuit.
Figure 10B:
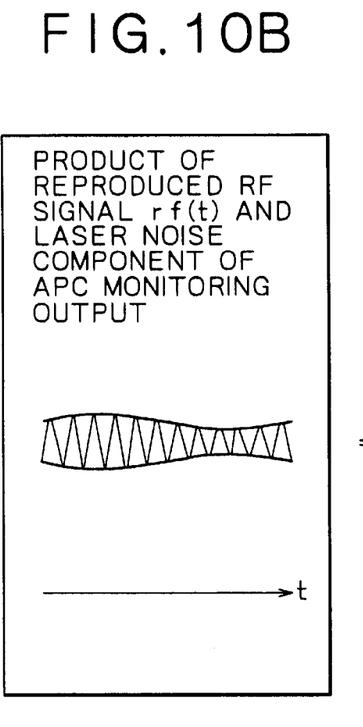
Figure 10C:
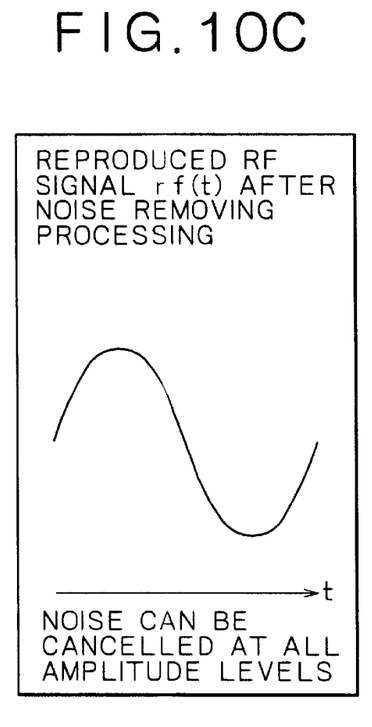

FIGS. 10A, 10B, and 10C are diagrams of assistance in explaining the processing of the laser noise canceling circuit 25 in the optical disk apparatus according to the present embodiment. The output signal from the first multiplier 251 is a product of the reproduced RF signal rf(t) multiplied by the DC component of the APC monitoring output signal, and is a reproduced RF signal including both the additive noise component and the modulated noise component, which are laser noise, as shown in FIG. 10A.

The output signal from the second multiplier is a product of the reproduced RF signal rf(t) multiplied by the laser noise component of the APC monitoring output signal, and is formed by the additive noise component and the modulated noise component, which are included in the output signal from the first multiplier 251, as shown in FIG. 10B.

Thus, both the output signal from the first multiplier 251 and the output signal from the second multiplier 254 include the additive noise component and the modulated noise component at the same level. Then, as described above, the arithmetic unit 255 subtracts the output signal from the second multiplier 254 from the output signal from the first multiplier 251 to thereby cancel both the additive noise component and the modulated noise component included in the signals at the same level. Thus, it is possible to cancel the laser noise at all amplitude levels of the reproduced RF signal, as shown in FIG. 10C.

In addition, signal level varying factors added to the reproduced RF signal such as variation in the reflectivity of the optical disk 100 and variation in laser power are added equally to the output signal from the first multiplier 251 and the output signal from the second multiplier 254. Therefore, it is possible to remove all the laser noise from the reproduced RF signal readily and reliably without effecting AGC on the subtrahend signal as in the conventional noise canceling method described with reference to FIG. 16.

Then, the reproducing system 20 of the optical disk apparatus according to the present embodiment shown in FIG. 1 supplies the reproduced RF signal from which the laser noise at all amplitude levels is removed from the arithmetic unit 255 to the AGC circuit 28. The AGC circuit 28 removes undesired amplitude variation resulting from variation in the reflectivity of the optical disk, for example.

The reproduced RF signal from which undesired amplitude variation is removed by the AGC circuit 28 is supplied to the equalizer 29. The equalizer 29 includes a three-tap transversal filter, for example, and equalizes the reproduced RF signal into a PR (1, 2, 1) characteristic.

Figure 11:
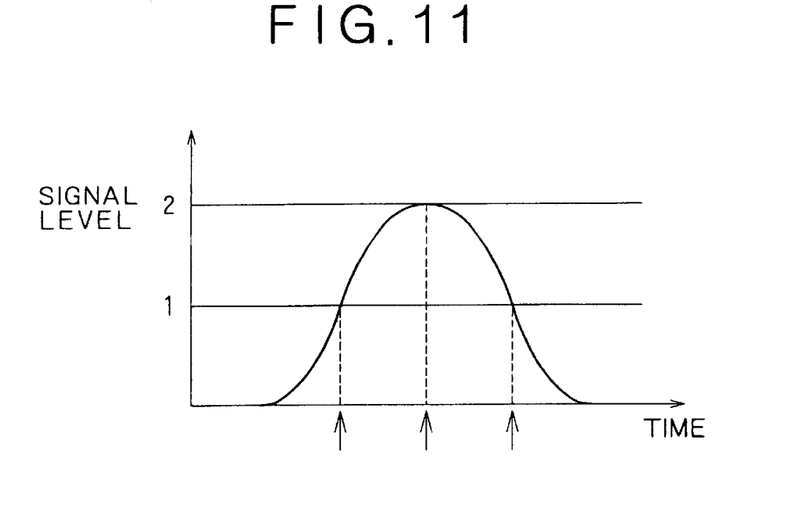
FIG. 11 is a diagram of assistance in explaining a PR (Partial Response) characteristic of an equalizer shown in FIG. 1.

Specifically, the equalizer 29 equalizes the reproduced RF signal into the so-called PR (1, 2, 1) characteristic in which as shown in FIG. 11, in terms of impulse response of the reproduced RF signal, amplitude ratio of sampling points at a peak position and the sides of the peak position indicated by arrows in FIG. 11 can be considered 2 and 1, respectively, and amplitude ratio at other positions can be considered 0.

Figure 12:
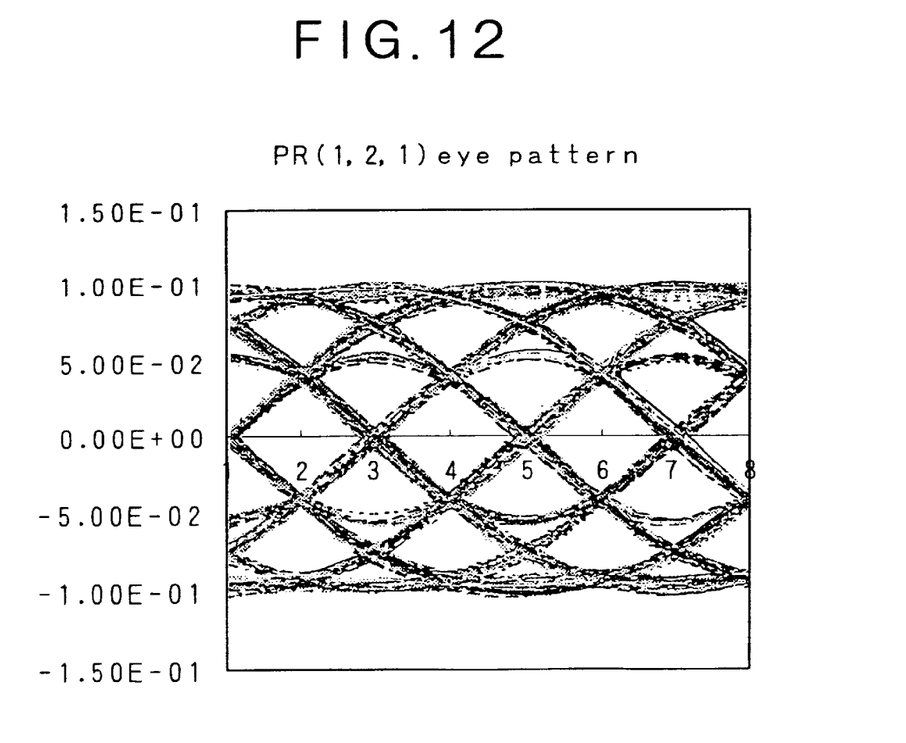
FIG. 12 is a diagram of assistance in explaining an eye pattern of a reproduced RF signal outputted from the equalizer shown in FIG. 1.

The output signal (reproduced RF signal) from the equalizer 29 thus equalized into the PR (1, 2, 1) characteristic forms an eye pattern as shown in FIG. 12. FIG. 12 shows an eye pattern of the reproduced RF signal equalized into the PR (1, 2, 1) characteristic, and shows an example of double-oversampling display. In FIG. 12, the eye pattern has at least four intersections at one sampling point indicated by a number 2, 4, 6, 8, . . . on the axis of abscissas, thus enabling multilevel detection.

The output signal (reproduced RF signal) from the equalizer 29 equalized into the PR (1, 2, 1) characteristic is then converted into a digital signal by the A/D converter 30. The digital signal is supplied to the Viterbi detector 32 to detect reproduced data at each decision level. The PLL circuit 31 in FIG. 1 is intended to form a clock signal used in the A/D converter 30.

Thus, the reproducing system of the optical disk apparatus according to the present embodiment has the equalizer 29 for equalizing the reproduced RF signal into the PR (1, 2, 1) characteristic and the Viterbi detector 32, and thereby performs PRML type reproduced signal processing. The signal from the optical disk 100 therefore needs to be reproduced by detecting accurate reproduced data from the reproduced RF signal at each decision level of the reproduced RF signal for multilevel detection.

As described above, the laser noise canceling circuit 25 in the reproducing system 20 of the optical disk apparatus according to the present embodiment removes not only the additive noise component but also the modulated noise component of the laser noise from the reproduced RF signal. Thus, the laser noise canceling circuit 25 removes the laser noise at every amplitude level of the reproduced RF signal. It is therefore possible to discriminate the reproduced RF signal at each decision level (Viterbi detection) suitably and accurately.

The reproduced data from the Viterbi detector 32 is supplied to the ECC decoder 33 to be subjected to error correcting processing and the like. The reproduced data is then supplied to an external apparatus via the interface circuit (described as I/F in FIG. 1) 34 and the terminal 35 for connection to the external apparatus.

In the present embodiment, the optical disk 100 is a DVD on which software such as a movie is recorded, for example. The video data and the audio data of the movie reproduced from the optical disk 100 are supplied via the I/F circuit 34 and the connecting terminal 35 to a monitor receiver and a speaker.

Thus, the reproducing system 20 of the optical disk apparatus according to the present embodiment can effectively remove both the additive noise component inherently possessed by the laser output light emitted from the semiconductor laser device 21 and the modulated noise component resulting from the additive noise component modulated by the recorded signal recorded on the optical disk, the additive noise component and the modulated noise component being noise components included in the reproduced RF signal.

It is thus possible to remove laser noise at all amplitude levels of the reproduced RF signal. Therefore, the optical disk apparatus according to the present embodiment that performs PRML type reproduction processing can improve a reproduction margin and favorably perform the reproduction processing.

Also, the laser noise canceling circuit 25 does not effect amplitude adjustment (AGC) of the signal being processed. It is therefore possible to remove the laser noise from the reproduced RF signal effectively by simple processing.

It is to be noted that in the present embodiment, the reproducing system 20 of the optical disk apparatus has been described as the system performing the PRML type reproduction processing; however, the present invention is not limited to this. A reproducing system that performs reproduction processing by conventional binary detection can also be provided with the laser noise canceling circuit 25.

A reproducing system that performs reproduction processing by conventional binary detection requires only laser noise around zero crossing level to be efficiently removed, and therefore does not require laser noise to be removed at all amplitude levels of the reproduced RF signal. Accordingly, in the case of a reproducing system that performs reproduction processing by binary detection, the laser noise canceling circuit 25 may be provided with an LPF 256, as shown in FIG. 13.

Figure 13:
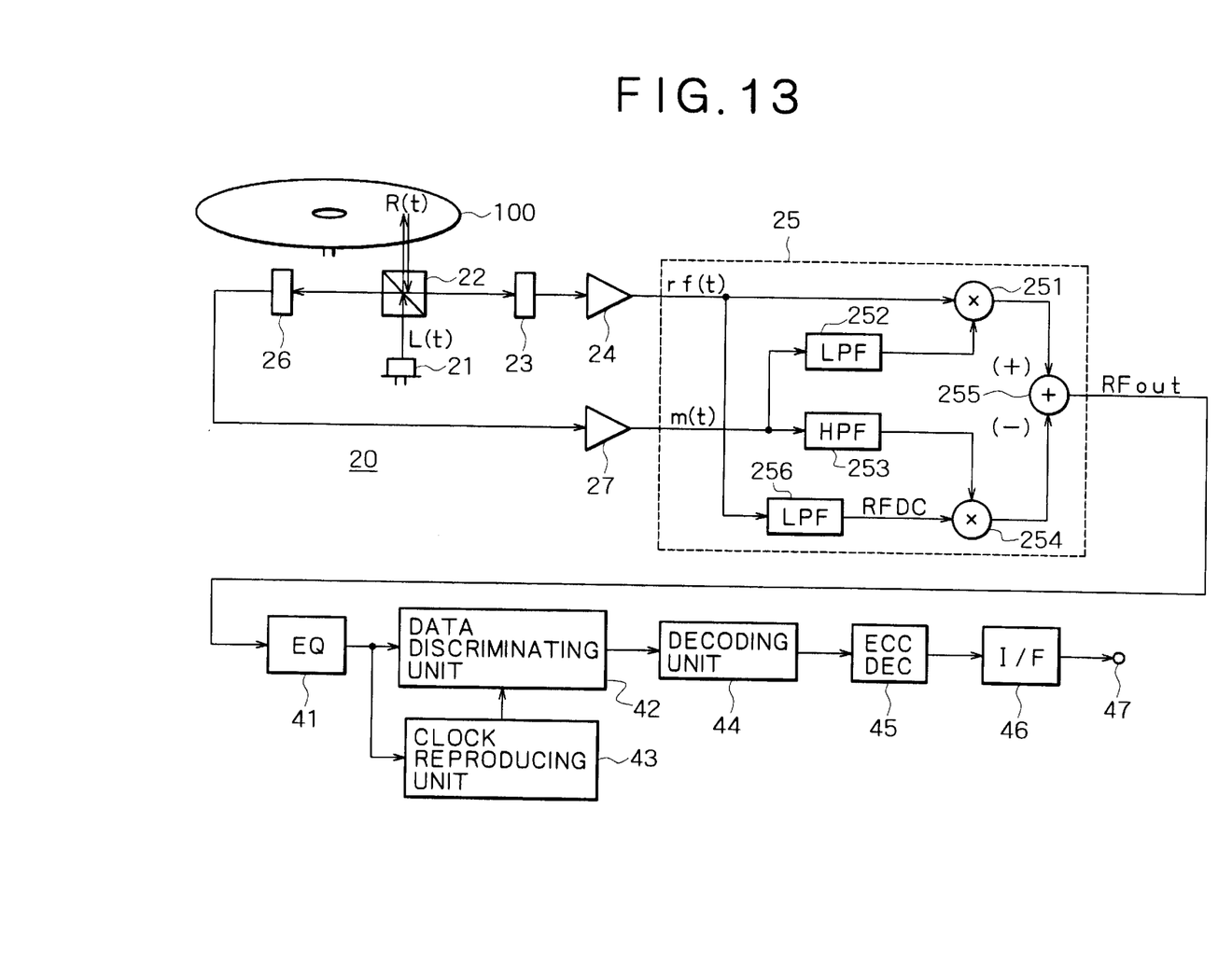
FIG. 13 is a block diagram of assistance in explaining another laser noise canceling circuit according to the present invention.

In FIG. 13, parts other than circuit parts of the LPF 256 and an equalizer 41 on down are formed in the same manner as the corresponding parts shown in FIG. 1. Therefore, in FIG. 13, the parts formed in the same manner as in the reproducing system 20 of the optical disk apparatus shown in FIG. 1 are identified by the same reference numerals as in FIG. 1, and their description will be omitted.

In the case of the example shown in FIG. 13, a reproduced RF signal rf(t) from an amplifier 24 is supplied to the LPF 256. The LPF 256 extracts only a low-frequency component of the reproduced RF signal rf(t), that is, a DC component of the reproduced RF signal rf(t), and then supplies the DC component to a multiplier 254.

Hence, the multiplier 254 is not supplied with a signal including a signal component recorded on an optical disk 100. Thus, the multiplier 254 outputs a signal formed by only the additive noise component of laser noise, which component is a product of the DC component of the reproduced RF signal and the laser noise component of an APC monitoring output signal. Thus, the multiplier 254 does not perform operation on a modulated noise component that does not need to be removed in the case of binary detection.

Hence, an arithmetic unit 255 forms a signal by efficiently removing only the additive noise component of the laser noise from the reproduced RF signal, and then supplies the signal to the equalizer 41. The equalizer 41 equalizes the reproduced RF signal supplied thereto into a PR (1, 2, 1) characteristic.

The reproduced RF signal equalized into the PR (1, 2, 1) characteristic is supplied to a data discriminating unit 42, where data is discriminated (distinguished). Since laser noise around zero crossing level is removed from the reproduced RF signal supplied to the data discriminating unit 42, the data discriminating unit 42 can accurately perform discriminating processing (binary detection).

Then, the data discriminated by the data discriminating unit 42 is decoded by a decoding unit 44. A clock reproducing unit 43 reproduces a clock signal used in discriminating the data. The data decoded by the decoding unit 44 is supplied to an ECC decoder unit 45 to be subjected to predetermined error detection and error correction. The data is then supplied to external apparatus such for example as a monitor receiver and a speaker via an interface circuit (described as I/F in FIG. 13) 46 and a connecting terminal 47.

Thus, since the laser noise canceling circuit 25 is provided with the LPF 256, operation on only the additive noise component included in the reproduced RF signal is performed without operation processing on the modulated noise component that does not need to be removed, so that the additive noise component of laser noise can be removed from the reproduced RF signal. Also in this case, no AGC is required in the laser noise canceling circuit 25.

The laser noise canceling circuits 25 shown in FIG. 1 and FIG. 13 determine signal frequency bands allowed to pass through the LPF 252 and the HPF 253 according to data transfer rate of the reproducing system 20. A reference frequency fc for indicating pass bands of the LPF 252 and the HPF 253 is $1/1000$ (one thousandth) of a Nyquist frequency fn or lower, which frequency is ½ (one half) of the data transfer rate of the reproducing system 20.

For example, when the data transfer rate of the reproducing system 20 is 66 Mbps, the Nyquist frequency fn is 33 MHz. Hence, as described above, the reference frequency fc of the LPF 252 and the HPF 253 is reference frequency fc=fn/1000=33 kHz.

The reference frequency fc of the LPF 252 and the HPF 253 is set at one thousandth of the Nyquist frequency fn because of the aim of preventing reproducing jitter from being aggravated to such an extent as to affect reproduction of data read from the optical disk.

The above embodiment has been described by taking an optical disk playback apparatus as an example. Specifically, as shown in FIG. 14, a reproducing system 20 of an optical disk playback apparatus 50 is provided with a noise canceling circuit 25, which makes it possible to remove both an additive noise component and a modulated noise component, which are laser noise included in a reproduced RF signal, and thus favorably reproduce data recorded on an optical disk.

Figure 14:
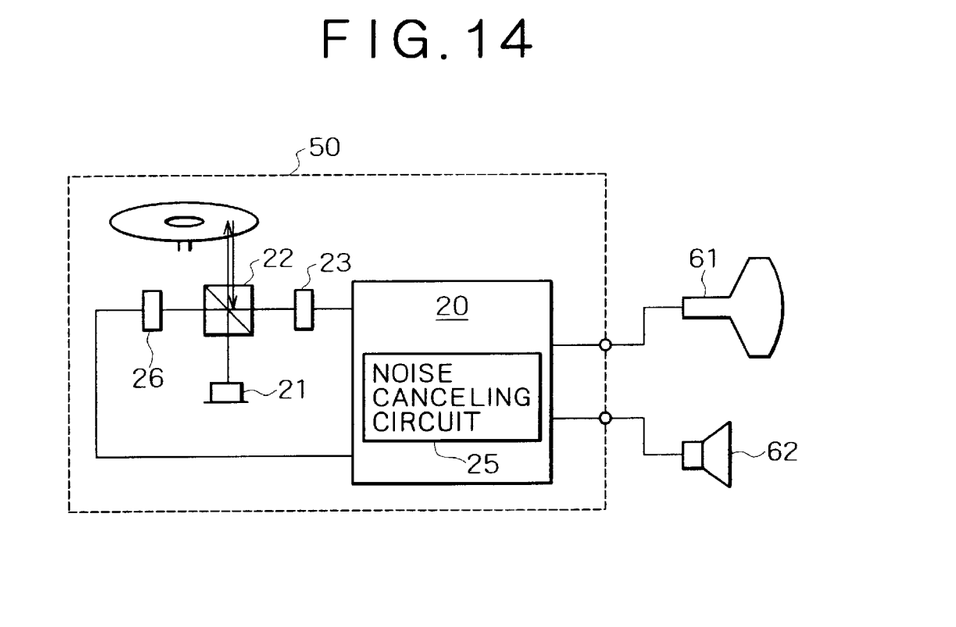
FIG. 14 is a diagram of assistance in explaining an optical disk playback apparatus according to the present invention.

When the reproduced data is video data, the video data is supplied to a monitor receiver 61, and then an image corresponding to the reproduced data is displayed on a display screen of the monitor receiver, as shown in FIG. 14. When the reproduced data is audio data, the audio data is supplied to a speaker 62 to emit sound corresponding to the reproduced data, as shown in FIG. 14.

External apparatus connected to the optical disk playback apparatus 50 include not only the monitor receiver and the speaker but also an optical disk recording and playback apparatus, an HDD (hard disk drive), a VTR (video tape recorder), a tape recorder, a portable terminal having a data recording function such as a portable telephone terminal, various recording apparatus such as a personal computer, and a network (communication network or broadcasting network).

Figure 15:
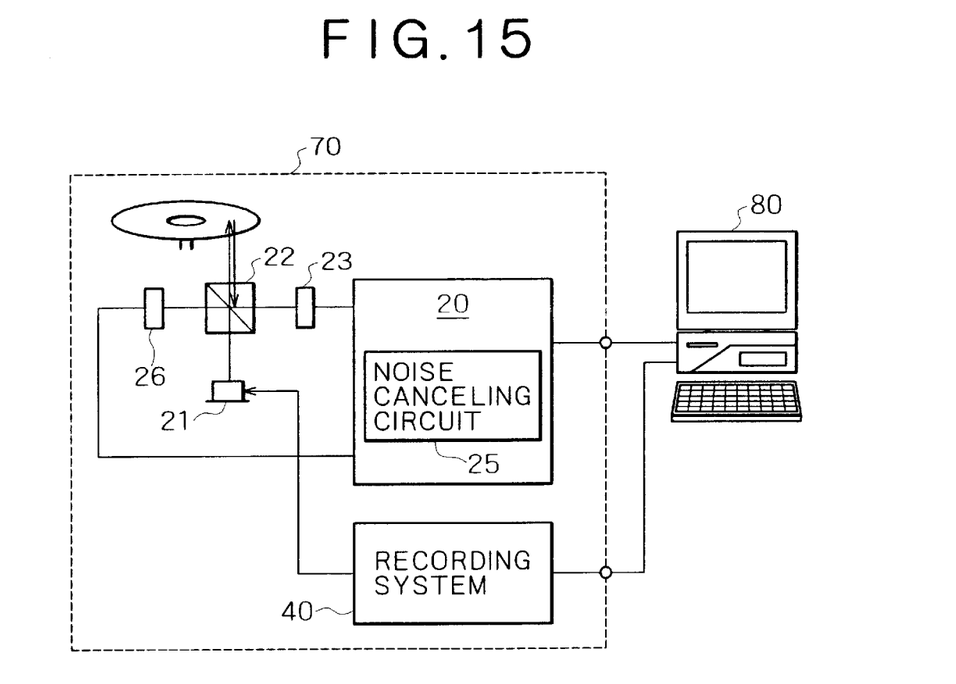
FIG. 15 is a diagram of assistance in explaining an optical disk recording and playback apparatus according to the present invention.

A laser noise canceling circuit 25 may of course be provided for a reproducing system of an optical disk recording and playback apparatus. Specifically, as shown in FIG.

15, a reproducing system 20 of an optical disk recording and playback apparatus 70 is provided with a laser noise canceling circuit 25, which makes it possible to remove both an additive noise component and a modulated noise component, which are laser noise included in a reproduced RF signal, and thus favorably reproduce data recorded on an optical disk.

In this case, in recording data, a semiconductor laser device 21 outputs laser output light corresponding to a recording signal from a recording system 40. Light intensity of the laser output light during recording is greater than that of laser output light used in reproduction. Thus, the semiconductor laser device 21 needs to emit laser output light at different powers during recording and reproduction.

Accordingly, the optical disk recording and playback apparatus 70 needs to optimize the laser output in recording mode for the medium. The optical disk recording and playback apparatus 70 therefore tends to use a power range with a high laser noise in reproducing mode. However, the laser noise canceling circuit 25 can remove an additive noise component and a modulated noise component.

Thus, by incorporating the laser noise canceling circuit 25 in the reproducing system 20 of the optical disk recording and playback apparatus that has greatly changing laser power and tends to degrade noise characteristics in reproduction, it is possible to effectively remove laser noise from the reproduced RF signal.

It is conceivable that the optical disk recording and playback apparatus 70 may be used as an external recording apparatus for a personal computer (PC) 80, for example, as shown in FIG. 15. Of course, the optical disk recording and playback apparatus 70 can be connected with various reproducing apparatus such as an optical disk playback apparatus, another optical disk recording and playback apparatus, a recording apparatus such as an HDD, and a network (communication network or broadcasting network).

The laser noise canceling circuits 25 shown in FIG. 1 and FIG. 13 can be incorporated into various optical disk playback apparatus and optical disk recording and playback apparatus by forming the laser noise canceling circuit into an IC and providing the IC as a laser noise canceling circuit (laser noise canceller) for use in a reproducing system of the optical disk playback apparatus and optical disk recording and playback apparatus.

As described above, the noise canceling circuit 25 can remove both the additive noise component and the modulated noise component of laser noise from the reproduced RF signal. Therefore, it is possible to favorably reproduce a signal recorded on an optical disk even when a laser device with poor noise characteristics producing much laser noise is used.

In other words, it is possible to use a laser device with poor noise characteristics that has conventionally been unusable. This makes it possible to improve the yield of laser devices and thus reduce the cost of laser devices.

A laser device that emits laser light may use a near-infrared laser having a wavelength of 780 nm (nanometers), a red laser having a wavelength of 630 nm, a blue laser or a blue-green laser having a wavelength of about 400 nm, or laser light having a shorter wavelength.

It is to be noted that in the embodiments described above, the optical disk has been described as a DVD; however, the optical disk is not limited to the DVD. A read-only DVD, a read-only CD, a DVD and a CD for recording and playback, and various other optical disks may be used as a recording medium.

As described above, according to the present invention, it is possible to remove both the additive noise component and the modulated noise component of laser noise included in the reproduced RF signal. Therefore, when applied to a PRML type reproducing system having multiple decision levels, in particular, the present invention can improve a reproduction margin.

Also, it is possible to eliminate the need for an AGC circuit necessary for a conventional laser noise canceling circuit for removing laser noise from a reproduced RF signal. This eliminates the need to adjust signal gain in the laser noise canceling circuit and hence the need to adjust the laser noise canceling circuit. Therefore, it is possible to reduce the cost of manufacturing the laser noise canceling circuit and the cost of manufacturing the optical disk playback apparatus and the optical disk recording and playback apparatus.

In addition, since both the additive noise component and the modulated noise component of laser noise can be removed efficiently, a semiconductor laser device with poor noise characteristics can be used as a semiconductor laser device for the optical disk playback apparatus and the optical disk recording and playback apparatus. Therefore, it is possible to improve the yield of semiconductor laser devices and thus reduce the cost of semiconductor laser devices.

While the preferred embodiments of the present invention have been described using the specific terms, such description is for illustrative purposes only, and it is to be understood that changes and variations may be made without departing from the spirit or scope of the following claims.

What is claimed is:

1. An optical disk playback apparatus comprising:
   a generating unit for generating laser light to be applied to an optical disk;
   a first light receiving unit for receiving said laser light applied from said generating unit to said optical disk and reflected from said optical disk, and converting the reflected light into an electric signal;
   a second light receiving unit for receiving at least part of said laser light applied from said generating unit to said optical disk, and converting said at least part of said laser light into an electric signal;
   a low-pass filter for extracting a direct-current component of said laser light from an output signal of said second light receiving unit;
   a first multiplying unit for determining a product of an output signal from said first light receiving unit and an output signal from said low-pass filter;
   a high-pass filter for extracting a laser noise component of said laser light from the output signal of said second light receiving unit;
   a second multiplying unit for determining a product of the output signal from said first light receiving unit and an output signal from said high-pass filter; and
   an arithmetic unit for subtracting an output signal of said second multiplying unit from an output signal of said first multiplying unit.

2. An optical disk playback apparatus as claimed in claim 1,
   wherein a pass band allowed to pass through each of said low-pass filter and said high-pass filter is determined on the basis of a data transfer rate of said optical disk playback apparatus.

3. An optical disk recording and playback apparatus having a laser light generating unit capable of changing power of laser light to be applied to an optical disk in recording and reproduction, a reproducing system of said optical disk recording and playback apparatus comprising:

a first light receiving unit for receiving laser light for reproduction applied from said generating unit to said optical disk and reflected from said optical disk, and converting the reflected light into an electric signal;

a second light receiving unit for receiving at least part of said laser light for reproduction applied from said generating unit to said optical disk, and converting said at least part of said laser light for reproduction into an electric signal;

a low-pass filter for extracting a direct-current component of said laser light from an output signal of said second light receiving unit;

a first multiplying unit for determining a product of an output signal from said first light receiving unit and an output signal from said low-pass filter;

a high-pass filter for extracting a laser noise component of said laser light from the output signal of said second light receiving unit;

a second multiplying unit for determining a product of the output signal from said first light receiving unit and an output signal from said high-pass filter; and an arithmetic unit for subtracting an output signal of said second multiplying unit from an output signal of said first multiplying unit.

4. An optical disk recording and playback apparatus as claimed in claim 3, wherein a pass band allowed to pass through each of said low-pass filter and said high-pass filter is determined on the basis of a data transfer rate of said reproducing system of said optical disk recording and playback apparatus.

5. A laser noise canceling circuit for a reproducing system of an optical disk apparatus, said laser noise canceling circuit comprising:

a low-pass filter for extracting a direct-current component of laser light for reproduction applied to an optical disk from a monitoring output signal of said laser light;

a first multiplier for determining a product of a reproduced radio-frequency signal from said optical disk and an output signal from said low-pass filter;

a high-pass filter for extracting a laser noise component of said laser light for reproduction applied to said optical disk from said monitoring output signal of said laser light;

a second multiplier for determining a product of said reproduced radio-frequency signal from said optical disk and an output signal from said high-pass filter; and an arithmetic unit for subtracting an output signal of said second multiplier from an output signal of said first multiplier.

6. A laser noise canceling circuit as claimed in claim 5, wherein a pass band allowed to pass through each of said low-pass filter and said high-pass filter is determined on the basis of a data transfer rate of said reproducing system of said optical DISK apparatus including said laser noise canceling circuit.

* * * * *